United States Patent [19]

DeMay

[11] 4,002,728

[45] Jan. 11, 1977

[54] HYDROGEN SULFIDE REMOVAL FROM CONTAMINATED SULFUR

[75] Inventor: George B. DeMay, Newberg, Oreg.

[73] Assignee: Chevron Research Company, San Francisco, Calif.

[22] Filed: Jan. 6, 1975

[21] Appl. No.: 538,844

[52] U.S. Cl. .......................................... 423/578 R
[51] Int. Cl.$^2$ ...................................... C01B 17/14
[58] Field of Search .......... 423/578, 567; 23/312 S, 23/267 S; 55/73

[56] References Cited

UNITED STATES PATENTS

| 1,586,539 | 1/1926 | Thornton | 23/267 S |
|---|---|---|---|
| 1,990,602 | 2/1935 | Guernsey | 23/267 S |
| 2,092,625 | 9/1937 | Rich | 423/578 |
| 3,364,655 | 1/1968 | Solinhac | 423/578 X |
| 3,799,884 | 3/1974 | Young | 23/267 S X |

FOREIGN PATENTS OR APPLICATIONS 1,001,486   8/1965   United Kingdom

*Primary Examiner*—G. O. Peters
*Attorney, Agent, or Firm*—G. F. Magdeburger; R. H. Davies; D. L. Hagmann

[57] ABSTRACT

The hydrogen sulfide content of hydrogen-sulfide-contaminated elemental sulfur in the liquid phase is reduced by an aqueous extraction which is carried out under superatmospheric pressure and a suitable temperature.

10 Claims, No Drawings

HYDROGEN SULFIDE REMOVAL FROM CONTAMINATED SULFUR

BACKGROUND OF THE INVENTION

This invention relates to a process for removing hydrogen sulfide from contaminated sulfur. More particularly, it relates to extracting hydrogen sulfide from contaminated sulfur using water.

PRIOR ART

Hydrogen sulfide is a source of elemental sulfur which is increasing in importance (1) because hydrogen sulfide cannot be vented to the atmosphere and must be converted to a less noxious and more useful material, and (2) because it is a large by-product of the refining of sulfur-contaminated petroleum. A serious problem with this sulfur is that it usually contains substantial amounts of dissolved or chemically bound hydrogen sulfide which is slowly liberated to the surrounding atmosphere. The liberated sulfide of itself is a dangerous mammalian poison, has a noxious odor with a threshold value as low as 0.13 ppm by volume, and when mixed with air produces an explosive mixture at concentrations as low as 4.4 volume percent. Consequently, and for reasons of safety and environmental protection, rather severe limits upon permissible emission of hydrogen sulfide into the atmosphere have been set by law in many industrialized nations. In view of these problems, an effective and low-cost method for removing hydrogen sulfide from sulfur derived from hydrogen sulfide is needed so that this by-product sulfur may be safely and economically stored and transported without exceeding these legal limits.

SUMMARY OF THE INVENTION

A process has now been found for effectively reducing the hydrogen sulfide content of hydrogen-sulfide-contaminated elemental sulfur, comprising extracting hydrogen sulfide from the sulfur by contacting the sulfur in the liquid phase with water at a temperature in the range from the melting point of the sulfur to about 165° C, with the contacting being at a pressure sufficient to maintain the water in the liquid phase. Surprisingly, the sulfide content of hydrogen-sulfide-contaminated sulfur is readily reduced to the 1-ppm (weight) range (less than about .1 ppm) by a superatmospheric pressure extraction of the sulfur using water. Advantageously, this extractive removal of hydrogen sulfide from the contaminated elemental sulfur is accomplished without the use of the aerating or gas-stripping means known and used in the art. Such practice has severe disadvantages in that the hydrogen sulfide is greatly diluted, may substitute an explosion problem for the sulfur contamination problem, and in the diluted form poses an enhanced recovery problem.

PREFERRED EMBODIMENT

In a preferred embodiment, a sulfur feedstock which contains dissolved and/or chemically bound hydrogen sulfide (extractable sulfide) is heated to about 127° C (260° F) and contacted with water in a liquid-liquid countercurrent extractor which is maintained at a pressure of about 3.4 atmospheres (35 psig) using a volume ratio of water to sulfur of 3-6 to 1, respectively. The resulting extracted sulfur, which has a hydrogen sulfide content of less than about 1 ppm (weight) is withdrawn from the extractor for product recovery. The aqueous extractant is withdrawn from the extractor and passed to a gas-liquid stripper for hydrogen sulfide removal. The stripped hydrogen sulfide is withdrawn from the stripper for recovery, and the stripped (renewed) aqueous extractant is withdrawn for recycle to the extractor.

ELEMENTAL SULFUR FEEDSTOCK

Elemental sulfur feedstocks, in general, containing at least an appreciable amount of hydrogen sulfide are improved by the present process and are contemplated as feedstocks for the process. A sulfur feedstock which contains as little as 2 ppm (weight) of chemically bound and/or dissolved hydrogen sulfide is a suitable feedstock. Contaminated elemental sulfur feedstocks comprising elemental sulfur and at least an appreciable amount of dissolved and/or chemically bound hydrogen sulfide are suitable feeds for this process and are contemplated for use herein. Elemental sulfur produced by oxidizing hydrogen sulfide, for example using sulfur dioxide, molecular oxygen, and the like, is frequently contaminated with unoxidized hydrogen sulfide and/or hydrogen polysulfides and the like, for example as may be produced by the Claus process. Such sulfur is a preferred feedstock for this process. Depending upon the efficiency of the process, the crude elemental sulfur reaction product mixture from such a hydrogen sulfide oxidation may contain an amount of the aforedescribed contaminant in the range from 25 to 1000 ppm, and even a higher amount. These are all satisfactory and contemplated feedstocks for this process.

TEMPERATURE

A temperature which is satisfactory for use in this process must be one sufficiently elevated to maintain the contaminated elemental sulfur feed in the liquid phase. It must not be too high, otherwise hydrolytic action of the water upon elemental sulfur causes an undue amount of additional hydrogen sulfide to be produced and, it appears, undesirable oxygenated elemental sulfur by-product. The optimum temperature for the extraction varies, depending upon the particular sulfur feed, its content of hydrogen sulfide and of other impurities. Usually a satisfactory temperature is in the range from about 113° to 165° C (about 235° to 347° F). The range 113° to 140° C (235° to 302° F) is preferred.

PRESSURE

The pressure required in this process varies depending upon the temperature used. It must be at least sufficient to maintain the water extractant in the liquid phase. Higher pressures may be used, and such use may be desirable in some degree because the solubility of hydrogen sulfide increases directly as the pressure is increased. Offsetting the solubility advantage, of course, are the increasing equipment and operational costs as operating pressures are raised. In general, a satisfactory process pressure will be in the range from about 1.6 to 10 (23 to 1470 psi), preferably 1.6 to 6.8, atmospheres.

EXTRACTION

In the present process, the distribution of hydrogen sulfide between the water phase and the elemental sulfur phase strongly favors the water phase. A marked reduction of the hydrogen sulfide content of the contaminated sulfur feed can therefore be achieved in a single (batch) 1-to-1 volumetric extraction. Therefore, ordinary liquid-liquid methods may be used and an effective removal, re to the 1-ppm-and-less range, of hydrogen sulfide is in general readily achieved. Depending upon the degree of contamination of the sulfur, an effective content reduction is achieved after from 2 to 10 extraction stages, or the equivalent, have been carried out. The extraction is desirably effected in an ordinary liquid-liquid extractor (see Sections 21-10 to 21-35 of Perry's Chemical Engineer's Handbook, John H. Perry et al, Fourth Ed., McGraw-Hill Book Co., N.Y., N.Y.), preferably in a continuous (differential) contact extractor.

EXTRACTANT RECYCLE

Desirably the water extractant is renewed or partially renewed and recycled to the process for the usual reasons: (1) conservation of water; and (2) reduction of the process burden in connection with placing discharged process water at a purity level which meets the permissible standards required for environmental protection. The renewal may be achieved by physical methods ordinarily employed for the reduction of the hydrogen sulfide concentration of an aqueous solution of hydrogen sulfide, preferably by one or more of: (1) fractional distillation; (2) reduced pressure flashing; and (3) gas-promoted stripping of hydrogen sulfide from the aqueous solution.

EXAMPLES

EXAMPLE 1

In this example a sample of elemental sulfur contaminated with hydrogen sulfide obtained from the oxidation of hydrogen sulfide in the Claus process was used. It had a hydrogen sulfide content of approximately 200 ppm (weight). The sulfur was extracted in two stages with water. In each stage, 5 volumes of water per volume of sulfur were used. The temperature and pressure of the extraction was 127° C (260° F) and 3.4 atmospheres (35 psig). The twice-washed sulfur had an $H_2S$ content of about 1 ppm (weight).

EXAMPLE 2

Example 1 was repeated except that 2 volumes of water per volume of sulfur were used and the contacting of the water and sulfur was more thorough. After the first extraction the sulfur contained 8 ppm of the sulfide; and after the second no sulfide could be detected in the washed sample.

Examples 1 and 2 demonstrate that hydrogen sulfide can be effectively extracted by water from liquefied elemental sulfur which is contaminated with hydrogen sulfide.

The use of steam stripping in connection with water washing appears to be helpful in some degree, for example as a mixing and heating aid.

EXAMPLE 3

A sample of the contaminated elemental sulfur containing about 200 ppm of hydrogen sulfide was stripped with 90 psig steam (about 160° C and 7.8 atmospheres). In view of the amount of hydrogen sulfide which was evolved, the stripping appeared to be accompanied by a generation of hydrogen sulfide from the interaction of elemental sulfur with water.

This example demonstrates that undesirable hydrolytic effects or the like are encountered when water interacts with elemental sulfur at elevated temperatures of the order of 160°-165° C, and higher.

What is claimed is:

1. A process for reducing the hydrogen sulfide content of hydrogen-sulfide-contaminated elemental sulfur, said sulfur containing at least an appreciable amount of said contaminant, which comprises extracting hydrogen sulfide from the sulfur by contacting the sulfur in the liquid phase with water, said contacting being effected using from 2 to about 10 extraction stages, being at a pressure sufficient to maintain the water in the liquid phase and at a temperature in the range from about the melting point of said sulfur to about 165° C.

2. A process as in claim 1 further characterized in that said temperature is in the range from about 113° to 140° C and said pressure is in the range from about 1.6 to 10 atmospheres.

3. A process as in claim 1 wherein said extraction is effected in about 2 to 6 stages.

4. A process as in claim 1 wherein said contacting is carried out in a liquid-liquid extractor.

5. A process as in claim 4 wherein said extractor is a continuous (differential) contact extractor.

6. A process as in claim 1 wherein said contacting is aided by steam stripping.

7. A process for effectively reducing the hydrogen sulfide content of hydrogen-sulfide-contaminated elemental sulfur which comprises extracting said contaminant from said sulfur by contacting the sulfur with water at a temperature of about 127° C and at a pressure of about 35 psig, said contacting being effected using from 2 to about 10 extraction stages, thereby reducing said contaminant content to less than about 1 ppm (weight).

8. A process for reducing the hydrogen sulfide content of hydrogen-sulfide-contaminated elemental sulfur, said sulfur containing an amount of hydrogen sulfide in the range from about 25 to 1000 ppm, which consists essentially of extracting hydrogen sulfide from said sulfur by contacting said sulfur in the liquid phase with water, said contacting being at a temperature of about 127° C and being effected in 2–10 stages in a liquid-liquid countercurrent extractor maintained at a pressure of about 3.4 atmospheres using a volume ratio of water to sulfur of 3–6:1, respectively, and recovering the resulting water-extracted sulfur, said sulfur containing less than about 1 ppm of hydrogen sulfide.

9. A process for reducing the hydrogen sulfide content of hydrogen-sulfide-contaminated elemental sulfur, said sulfur containing at least an appreciable amount of said contaminant, which comprises extracting hydrogen sulfide from the sulfur by contacting the sulfur in the liquid phase with water using from 2 to about 10 extraction stages in a liquid-liquid extractor, said contacting being at a pressure sufficient to maintain the water in the liquid phase and at a temperature in the range from about the melting point of said sulfur to about 165° C, including the steps:
1. withdrawing said water extractant from said liquid-liquid extractor,
2. passing said withdrawn water to a gas-liquid stripper,
3. separating hydrogen sulfide from said water in said gas-liquid stripper,
4. withdrawing the resulting hydrogen sulfide stripped water from said stripper, and 5. passing at least a portion of said hydrogen sulfide stripped water in recycle to said liquid-liquid extractor.

10. A process for effectively reducing the hydrogen sulfide content of hydrogen-sulfide-contaminated elemental sulfur, which comprises extracting said contaminant from said sulfur by contacting the sulfur with water at a temperature of about 127° C and at a pressure of about 35 psig, said contacting being effective using from 2 to about 10 extraction stages, including the steps:

1. separating said extracted sulfur and said water,
2. passing said separated water to a gas-liquid stripper,
3. separating hydrogen sulfide from said withdrawn water in said gas-liquid stripper,
4. withdrawing the resulting hydrogen sulfide stripped water from said gas-liquid stripper, and
5. passing at least a portion of said hydrogen sulfide stripped water in recycle to said process.

* * * * *